US012754096B2

(12) United States Patent
Wetzig et al.

(10) Patent No.: US 12,754,096 B2
(45) Date of Patent: Oct. 6, 2026

(54) LEAK DETECTION DEVICE

(71) Applicant: INFICON GMBH, Cologne (DE)

(72) Inventors: Daniel Wetzig, Cologne (DE); Maximilian Reismann, Cologne (DE); Jochen Purchalla-Konig, Bergheim (DE); Josef Grenz, Geesthacht (DE)

(73) Assignee: Inficon GMBH, Cologne (DE)

( * ) Notice: Subject to any disclaimer, the term of this patent is extended or adjusted under 35 U.S.C. 154(b) by 275 days.

(21) Appl. No.: 18/565,168

(22) PCT Filed: May 24, 2022

(86) PCT No.: PCT/EP2022/064017

§ 371 (c)(1),
(2) Date: Nov. 29, 2023

(87) PCT Pub. No.: WO2022/263121

PCT Pub. Date: Dec. 22, 2022

(65) Prior Publication Data

US 2024/0361201 A1 Oct. 31, 2024

(30) Foreign Application Priority Data

Jun. 15, 2021 (DE) ..................... 10 2021 115 463.4

(51) Int. Cl.
*G01M 3/20* (2006.01)

(52) U.S. Cl.
CPC .................................. *G01M 3/205* (2013.01)

(58) Field of Classification Search
None
See application file for complete search history.

(56) References Cited

U.S. PATENT DOCUMENTS

| | | | | |
|---|---|---|---|---|
| 4,779,449 | A | 10/1988 | Bley et al. | |
| 4,794,784 | A * | 1/1989 | Bley | G01M 3/207 73/40 |
| 9,316,559 | B2 * | 4/2016 | Döbler | F04D 27/0269 |
| 9,810,597 | B2 | 11/2017 | Hilgers et al. | |

(Continued)

FOREIGN PATENT DOCUMENTS

| | | | |
|---|---|---|---|
| CN | 87105703 | A | 10/1988 |
| CN | 101939628 | A | 1/2011 |

(Continued)

OTHER PUBLICATIONS

Machine translation of KR101930219 by EPO (Year: 2026).*

(Continued)

*Primary Examiner* — Mark A Shabman
(74) *Attorney, Agent, or Firm* — Harris Beach Murtha Cullina PLLC

(57) ABSTRACT

In a leak detection device comprising a gas analyzer, a vacuum pump, a first gas inlet, and a second gas inlet, it is provided that a first multi-way valve is connected to a first inlet and at least a first and a second outlet, wherein the inlet is connected to the first gas inlet, a second multi-way valve is connected to first inlet and at least a first and a second outlet, wherein the inlet is connected to the second gas inlet, wherein the two first outlets of the two multi-way valves are connected to the gas analyzer, and the two second outlets of the two multi-way valves are connected to the vacuum pump.

8 Claims, 2 Drawing Sheets

(56) References Cited

U.S. PATENT DOCUMENTS

| | | | | |
|---|---|---|---|---|
| 2004/0051043 | A1 | 3/2004 | Kilian et al. | |
| 2010/0326169 | A1 | 12/2010 | Grosse-Bley et al. | |
| 2013/0213114 | A1 * | 8/2013 | Wetzig | G01N 25/20<br>73/25.03 |

FOREIGN PATENT DOCUMENTS

| | | | | | |
|---|---|---|---|---|---|
| CN | 105556272 | A | | 5/2016 | |
| CN | 205748829 | U | | 11/2016 | |
| DE | 19853049 | A1 | | 6/2000 | |
| JP | S56-149913 | A | | 11/1981 | |
| JP | 2005-121481 | A | | 5/2005 | |
| KR | 101930219 | B1 | * | 12/2018 | G01N 1/26 |

OTHER PUBLICATIONS

ISA/EPO International Search Report and Written Opinion for corresponding International Application No. PCT/EP2022/060417 dated Sep. 2, 2022 (19 pages).
German Search Report dated Mar. 9, 2022 (70 pages).
Japanese Office Action issued Feb. 10, 2026 in reference to corresponding Japanese patent application—English translation (1 page).

* cited by examiner

LEAK DETECTION DEVICE

CROSS-REFERENCE TO RELATED APPLICATIONS

This application is a national stage application under 35. U.S.C. § 371 of PCT Application No. PCT/EP2022/064017, filed on May 24, 2022, which claims priority to, and the benefit of, German Application No. 10 2021 115 463.4 filed on Jun. 15, 2021, the entire contents of each application being incorporated herein by reference thereto.

The invention relates to a leak detection device comprising a gas analyzer, a vacuum pump, a first gas inlet, and a second gas inlet, in particular for sniffer leak detection.

When detecting gas leaks, gas is drawn in through a gas inlet with the aid of a vacuum pump and supplied to a gas analyzer in order to analyze the drawn-in gas. In doing so, a test gas flowing through a leak is to be detected. A special variant of gas detection of gas leaks is sniffer leak detection, in which a constant air flow is drawn in through the gas inlet of a sniffer probe. The sniffer probe is guided over the test object to be examined while the drawn-in gas is analyzed. Thus, a leak in the test object can not only be detected but also localized. If the gas inlet of the sniffer probe is near a gas leak, the test gas that has escaped through the leak is received together with the air flow. To ensure that the leakage gas is drawn in reliably and as completely as possible, the largest possible sniffer gas flow is used. The sniffer gas flow is the flow rate of the gas flow drawn in through the gas inlet of the sniffer probe. Here, the flow rate of the air flow is typically many times greater than the flow rate of the measured leakage gas of the test gas that has escaped from a leak.

The concentration of the leakage gas in the gas flow drawn in through the gas inlet is the ratio of the leakage rate and the sniffer gas flow. Thus, the concentration of the leakage gas in the gas flow received by the sniffer probe is typically comparatively low. As a result, the sniffer gas flow cannot be selected as large as desired.

Often, the atmosphere surrounding the test specimen contains gas components that generate similar or identical measurement signals to the test gas in the gas detector or gas analyzer. These gas components are therefore referred to as interfering gases or subsurface gases. They cause interfering signals that cannot easily be distinguished from the measurement signals of real leakage gases.

A known method for suppressing such interfering signals is to alternately receive measuring gas from the test area of the test specimen to be examined and reference gas from the atmosphere surrounding the test specimen. The reference gas serves as a reference for determining the proportion of the interfering gas in the drawn-in gas mixture (reference measurement).

Such solutions are described in EP 1 342 070 B1 and EP 1 819 998 B1, for example. The gas is drawn in by a compact sensor unit in the form of an infrared absorption sensor in the handle of a sniffer probe. In WO 2007/031386 A1, a mass spectrometer is used as a gas analyzer. The drawn-in gas must be supplied to the analyzer via a sniffer line.

In other sniffer leak detection methods, several, typically two, separate sniffer probes are independently connected to the same gas analyzer and operated in alternation to alternately evaluate the signal from the one sniffer probe and the other sniffer probe. In such so-called multiplexer systems, leak detection is performed with a gas detection system with several sniffer lines at multiple locations by switching serially from one line to another.

When switching two gas inlets of a leak detection device connected to the same gas analyzer, a pressure surge occurs in the sniffer line, which affects the measurement signal and leads to signal fluctuations.

The object of the invention is to provide an improved leak detection device having two different gas inlets, each connected to the same gas analyzer, and a corresponding leak detection method.

The leak detection device of the invention is defined by the features of claim 1. Accordingly, two multi-way valves are provided, each having a first inlet and at least a first and a second outlet. The multi-way valves can be, for example, 3/2-way valves with one inlet and two outlets. The first outlet of each of the two multi-way valves is connected to a first gas inlet of the leak detection device, while the second outlet of each of the two multi-way valves is connected to a separate vacuum pump. The two multi-way valves simplify the switching and assignment of the two gas inlets to the gas analyzer. While the gas drawn in through the first gas inlet with the one multi-way valve is supplied to the gas analyzer, the gas drawn in through the second gas inlet is drawn in by the vacuum pump without being supplied to the gas analyzer. By simply switching the multi-way valves, pressure surges can be avoided or reduced because a gas flow is drawn in through both gas inlets, while alternately either the one or the other gas flow can be analyzed with the gas analyzer.

The two gas inlets may be arranged on different sniffer probes, each connected to the two multi-way valves by separate sniffer lines. Here, the vacuum pump may be a separate auxiliary pump that is not connected to the gas analyzer. The gas analyzer may be a mass spectrometric leak detector having a multi-stage high vacuum pump The vacuum pump connected to the two second outlets is preferably open to the atmosphere.

Alternatively, the two gas inlets may be the measuring gas inlet and a reference gas inlet of the same sniffer probe. Here, the vacuum pump may form a pump stage, for example a pre-vacuum stage, of a multi-stage high vacuum pump of a mass spectrometric gas analyzer. In this case, the two first outlets of the multiway valves are connected to the mass spectrometer, while the two second outlets of the multi-way valves are connected via a separate connecting line to a connecting branch that connects the vacuum pump to the other pumping stages of the high vacuum pump and to the mass spectrometer. Throttles are provided in the two connecting lines to respectively set the required and desired gas flow. Alternatively, the connecting line itself may be designed to act as a throttle for the gas flow. The two first outlets may be connected to the two second outlets, so that only a branched-off partial flow is supplied to the gas analyzer, while the remaining portion of the gas flow is delivered to atmosphere via the vacuum pump.

In the following, two exemplary embodiments of the invention are explained in more detail with reference to the Figures.

Figure 1:
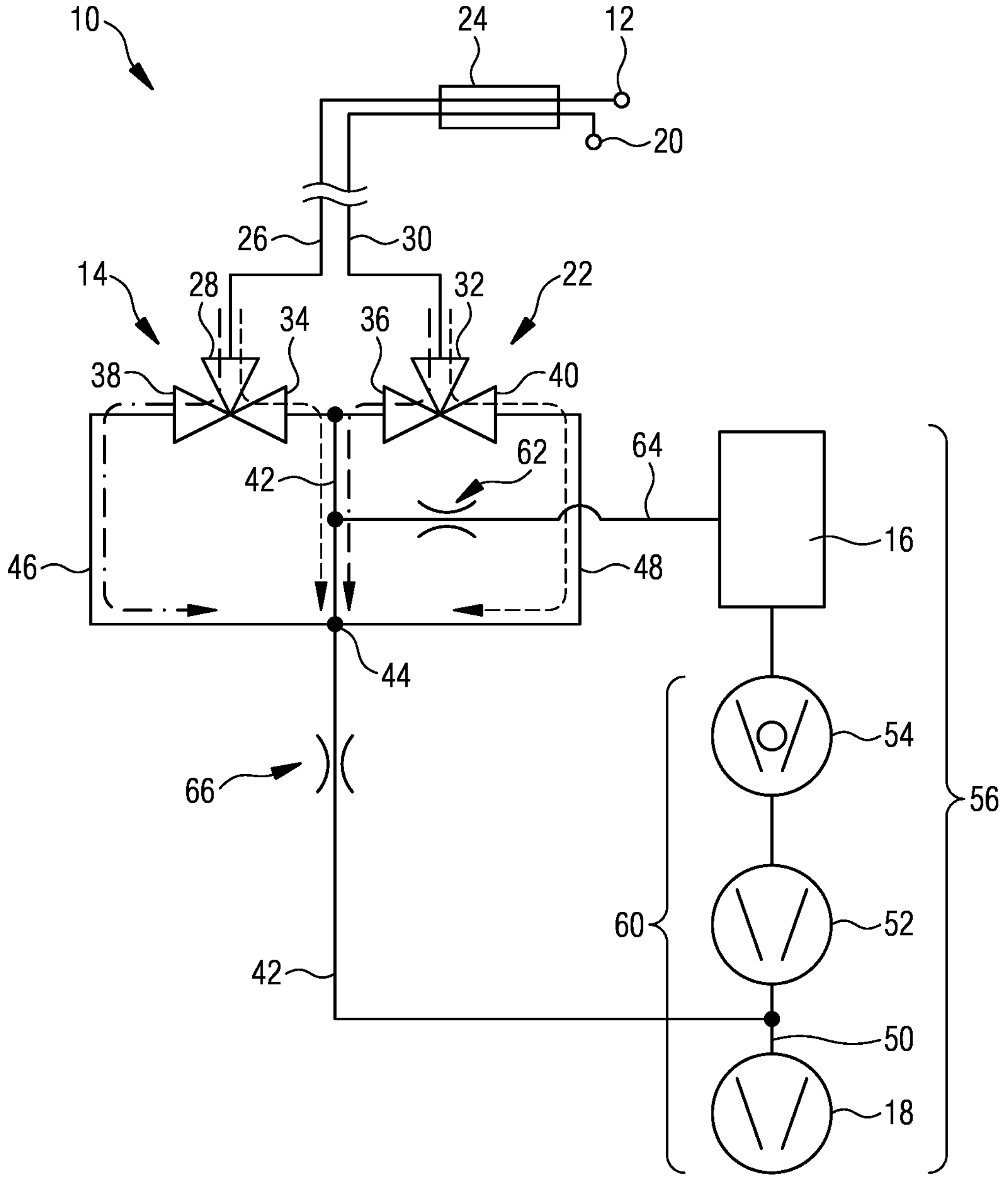
FIG. 1 shows a first exemplary embodiment.

In both leak detection devices 10 shown in the figures, a first gas inlet 12 is connected to a mass spectrometric gas analyzer 16 and a vacuum pump 18 via a first multi-way valve 14 in the form of a 3/2-way valve, while a second gas inlet 20 is also connected to gas analyzer 16 and vacuum pump 18 via a second multi-way valve 22 in the form of a 3/2-way valve.

In the first exemplary embodiment according to FIG. 1, the two gas inlets 12, 20 are provided on a common sniffer probe 24 in such a way that the first gas inlet 12 is directed towards a test area to be examined in which a gas leak is suspected at a test specimen, while the second gas inlet 20 forms a reference gas inlet with which gas can be drawn in from the atmosphere surrounding the test specimen.

The first gas inlet 12 is connected to the one first inlet 28 of the first multi-way valve 14 via a first connecting line 26. The second gas inlet 20 is connected to a first inlet 32 of the second multi-way valve 22 via a separate connecting line 30.

Furthermore, in both exemplary embodiments, a first outlet 34 of the first multiway valve 14 is connected to the first outlet 36 of the second multi-way valve 22 and to gas analyzer 16, while a second outlet 38 of the first multi-way valve 14 is connected to a second outlet 40 of the second multi-way valve 22 and to vacuum pump 18 in a gas-conducting manner.

Figure 2:
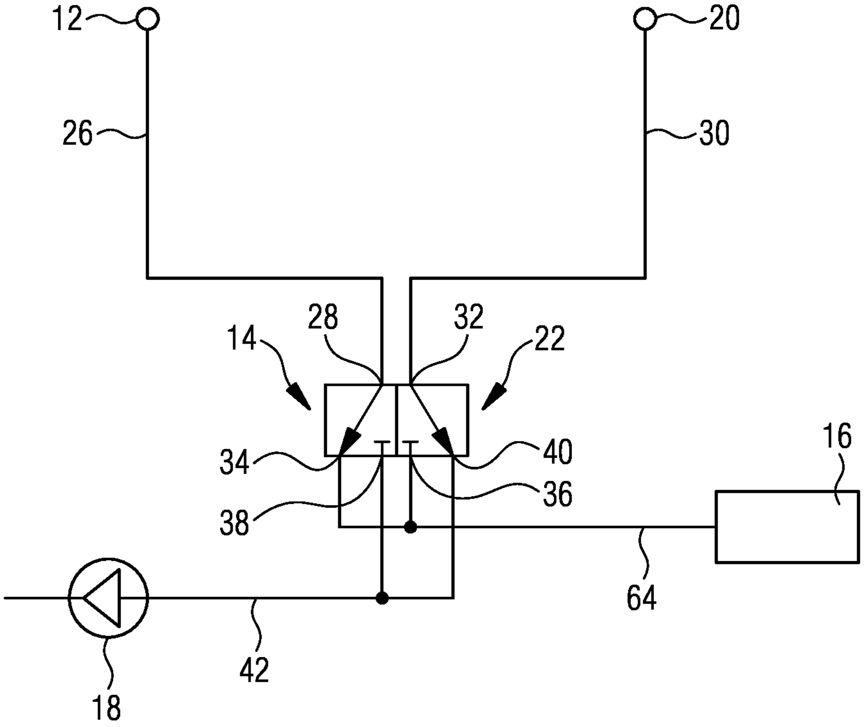
FIG. 2 shows a second exemplary embodiment.

In the exemplary embodiment shown in FIG. 2, the two gas inlets 12, 20 are provided on different sniffer probes, which are connected to the two multi-way valves 14, 22 via separate connecting lines and can be guided and moved independently of each other.

In the first exemplary embodiment according to FIG. 1, the two first outlets 34, 36 open into a common connecting line 42, which is connected in a junction 44 with a connecting line 46, which is connected to the second gas outlet 38 of the first multi-way valve 14, and a further connecting line 48, which is connected to the second outlet 40 of the second multi-way valve 22. The common connecting line 42 is connected across junction 44 to a connecting branch 50 that connects vacuum pump 18 to a second vacuum pump 52. The second vacuum pump 52 is connected to a turbomolecular pump 54, the inlet of which is in turn connected to gas analyzer 16 in the form of a mass spectrometer. Thus, vacuum pump 18 forms a first pump stage of a three-stage high vacuum pump of the mass spectrometric leak detector 56 consisting of vacuum pump 18, the second vacuum pump 52, turbomolecular pump 54, and gas analyzer 16 (mass spectrometer). The second vacuum pump 52 thus forms the second pump stage and turbomolecular pump 54 forms the first pump-stage of the multi-stage high vacuum pump 60.

Between the first two gas outlets 34, 36 and junction 44, a line 64, throttled via a throttle 62, branches off from connecting line 42 and is connected to gas analyzer 16 and branches off a partial flow from the gas flow flowing through line 42 and supplies it to gas analyzer 16, while the remaining gas flow is supplied to vacuum pump 18 via junction 44 and to the atmosphere by vacuum pump 18. Here, connecting line 42 comprises a second throttle 66 between junction 44 and connecting branch 50, which is used as a blocking of the gas flow. Due to the blocked flow, a pressure surge on the downstream side of the throttle, e.g. caused by the pump, does not have a disturbing effect in the form of pressure fluctuations on the upstream side.

In contrast, in the second exemplary embodiment, connecting line 42 from the two outlets 38, 40 to the vacuum pump 18 and connecting line 64 from the two outlets 34, 36 to gas analyzer 16 are separated from each other and are thereby not connected to each other in a gas-conducting manner.

In both exemplary embodiments, vacuum pump 18 remains on during gas analysis with the gas analyzer 16 and delivers gas from the one of the two gas inlets 12, 20 that is not connected to gas analyzer 16 via the multi-way valves 14, 22. Thus, in the exemplary embodiment and switching state shown in FIG. 2, gas from the first gas inlet 12 is supplied to gas analyzer 16 for gas analysis via the first multiway valve 14 from its first inlet 28 via its first outlet 34 and connecting line 64, while at the same time gas flowing in through the second gas inlet 20 is supplied via the second multi-way valve 22 from its first inlet 32 to its second outlet 40 and from there is delivered to the atmosphere via connecting line 42 via pump 18. Thus, while the gas from the first gas inlet 12 is being analyzed by the gas analyzer 16, the gas from the second gas inlet 20 is being pumped to atmosphere by pump 18.

In the exemplary embodiment shown in FIG. 1, in which the first gas inlet 12 forms a measuring gas inlet and the second gas inlet 20 forms a reference gas inlet of the same sniffer probe 24, the gas from the first gas inlet 12 is supplied via line 26 to the first inlet 28 of the first multi-way valve 14, while at the same time vacuum pump 18 draws in gas through the second gas inlet 20, which is supplied via line 30 to inlet 32 of the second multi-way valve 22. In a first switching state, the first multi-way valve 14 connects the first inlet 28 with the first outlet 34 so that the gas drawn in through the first gas inlet 12 is supplied via the first outlet 34 of connecting line 42. From this gas flow, a partial flow is branched off via the throttled line 64 and supplied to the mass spectrometric gas analyzer 16, while the remaining gas flow is added to the atmosphere across junction 44 through the second throttle 66 and vacuum pump 18. At the same time, the second multi-way valve 22 directs gas drawn in from the second gas inlet 20 from inlet 32 to the second outlet 40, from where the gas is directed via line 48 and via junction 44 into the common connecting line 42. From there, the gas is delivered to the atmosphere via vacuum pump 18.

Then, both multi-way valves 14, 22 are synchronously switched from the first switching state to a second switching state. In the second switching state, the first multi-way valve 14 directs the gas from the first gas inlet 12 via the second gas outlet 38 to vacuum pump 18 without such gas entering gas analyzer 16. Meanwhile, the second multi-way valve 22 directs gas from the second gas inlet 20 via the first gas outlet 36 into the common connecting line 42, from which a partial flow is directed via the throttled line 64 to gas analyzer 16 for analysis.

By synchronous, simultaneous switching of the two multi-way valves 14, 22, gas from only one of the two gas inlets 12, 20 enters gas analyzer 16 and can be analyzed there, while the gas from the other gas inlet is pumped to the atmosphere via vacuum pump 18. By synchronous, simultaneous switching of the two multiway valves 14, 22, the two gas inlets 12, 20 can be alternately connected to the gas analyzer without significant delays and/or pressure surges during switching. The continuously pumped flow through both lines 26, 30 causes the pressure gradient in the line to be maintained so that a pressure surge at the inlet to the detection system is avoided during switching.

A further advantage of the continuous gas flow through the two lines 26, 30 is that gas received via the two inlet openings 12, 20 also reaches the switching valves 14, 22 at the same time. The transit time of the gas front through lines 26, 30 can be a few seconds. If the line which is not connected to gas analyzer 16 or leak detector 56, respectively, would no longer be pumped continuously, the reaction time would be delayed by a few seconds.

The invention claimed is:

1. A leak detection device comprising a gas analyzer, a vacuum pump, a first gas inlet, and a second gas inlet, wherein:

a first multi-way valve has a first inlet and at least a first and a second outlet, wherein the inlet of the first multi-way valve is connected to the first gas inlet, and a second multi-way valve has a first inlet and at least a first and a second outlet, wherein the first inlet of the second multi-way valve is connected to the second gas inlet, wherein the two first outlets of the two multi-way valves are connected to the gas analyzer, and the two second outlets of the two multi-way valves are connected to the vacuum pump, and wherein the multi-way valves are configured and controlled by a valve control device such that the inlet of the first multi-way valve is connected to its first outlet if the inlet of the second multi-way valve is connected to its second outlet and the two multi-way valves are synchronously switched.

2. The leak detection device according to claim 1, wherein the two gas inlets are arranged on different sniffer probes.

3. The leak detection device according to claim 1, wherein the gas analyzer is a mass spectrometric leak detector having a multi-stage high vacuum pump.

4. The leak detection device according to claim 3, wherein the vacuum pump is a separate auxiliary pump that is not connected to the leak detector.

5. The leak detection device according to claim 3, wherein the vacuum pump forms a pump stage of the multi-stage high vacuum pump.

6. The leak detection device according to claim 3, wherein the two first outlets are connected to the two second outlets, and are connected to the gas analyzer via a throttled line and to a connecting branch connecting the vacuum pump to the high vacuum pump via a throttled further line.

7. The leak detection device according to claim 1, wherein the two first outlets are connected to the gas analyzer via a common connecting branch, while the two second outlets are connected to the vacuum pump via a common connecting line.

8. A method for sniffer leak detection with a leak detection device according to any one of the preceding claims, comprising:

switching on the vacuum pump, connecting the inlet of the first multi-way valve with its first outlet, and connecting the inlet of the second multi-way valve with its second outlet, analyzing the gas drawn in through the first gas inlet by means of the gas analyzer, while gas is drawn in through the second gas inlet by means of the vacuum pump, synchronously switching the two multi-way valves, while the vacuum pump remains on, and analyzing the gas drawn in through the second gas inlet by means of the gas analyzer, while gas is drawn in through the first gas inlet by means of the vacuum pump.

* * * * *